Patented Dec. 13, 1927.

1,652,783

UNITED STATES PATENT OFFICE.

NORMAN A. HANSEN, OF LAKE BLUFF, ILLINOIS, ASSIGNOR TO ABBOTT LABORATORIES, OF NORTH CHICAGO, ILLINOIS, A CORPORATION OF ILLINOIS.

ANÆSTHETIC COMPOUND.

No Drawing.   Application filed December 18, 1926.   Serial No. 155,769.

My invention relates to tartrates of anæsthetic compounds and I will describe as a specific example the tartrate of para-aminobenzoyl-di-n-butylamino propanol, having the formula $$[NH_2C_6H_4COO(CH_2)_3N(C_4H_9)_2]_2C_4H_6O_6.$$

As is well known, the salts of anæsthetic bases may vary widely in their solubilities, stability, hydrogen ion concentrations in solution, irritating properties, and efficiency. In the particular case of para-amino-benzoyl-di-n-butylamino propanol (for convenience called X), the hydrochloride is soluble in cold water to the extent of less than 1%. It has a pH of about 5.5, and when used as an anæsthetic, it may produce a temporary smarting, lasting for several seconds. Other salts of X, the pH of which is nearer 7, and which are, therefore, less irritating, such as the succinate or lactate, are not entirely stable in solution, undergoing hydrolysis upon boiling, so that some of the anæsthetic base separates as oily droplets. It is also known that anæsthetic salts are frequently more efficient, the higher the pH values.

It has now been found that the tartrate of X is free from the above objections. It is readily and sufficiently soluble in water, giving stable solutions which may be sterilized without appreciable decomposition. The aqueous solutions of X tartrate have a pH of about 6.8, making them well tolerated when injected or applied topically, and practically free from irritating qualities. Furthermore, X tartrate, while more efficient than the mineral acid salts of the anæsthetic base, is also somewhat less toxic, so that its use is attended with greater safety.

*Method of preparation.*—A solution of 75 grams of tartaric acid in 1000 cc. of water is heated to about 90° C., and to this solution is added 306 grams of the anæsthetic base. The anæsthetic base goes into solution, and when the solution is cooled, the tartrate of the anæsthetic crystallizes out. After centrifuging off the crystals, they are purified by recrystallization from 95% alcohol. The pure white crystals melt at 144–145° C. The product is readily soluble in water, producing stable solutions.

Both the water used to dissolve the tartaric acid, and the temperature at which the anæsthetic base is added, may be varied within rather wide limits. Other solvents than water may also be used for dissolving the components.

I claim as my invention:

1. As a new product of manufacture, the tartrate of para-amino-benzoyl-di-n-butyl amino propanol, having the formula $$[NH_2C_6H_4COO(CH_2)_3N(C_4H_9)_2]_2C_4H_6O_6.$$

2. As a new anæsthetic compound, the tartrate of para-aminobenzoyl-di-n-butylamino propanol, which is a white crystalline solid, melting at 144–145° C.

NORMAN A. HANSEN.